(12) United States Patent
Fatemi (10) Patent No.: US 7,954,207 B2
(45) Date of Patent: Jun. 7, 2011

(54) APPARATUS AND METHOD FOR SECURING AND PROTECTING ELECTRONIC DEVICES

(76) Inventor: Ali Fatemi, San Clemente, CA (US)

( * ) Notice: Subject to any disclaimer, the term of this patent is extended or adjusted under 35 U.S.C. 154(b) by 1003 days.

(21) Appl. No.: 11/603,366

(22) Filed: Nov. 21, 2006

(65) Prior Publication Data

US 2008/0115333 A1    May 22, 2008

(51) Int. Cl.
*A44B 99/00*    (2010.01)
(52) U.S. Cl. ............... 24/298; 24/300; 24/301; 24/302; 24/17 R
(58) Field of Classification Search ............ 24/298–302, 24/16 R, 17 R, 17 AP, 17 B, 662, 591.1, 581.11, 24/457, 458, 459, 453, 604, 595.1, 448, 297
See application file for complete search history.

(56) References Cited

U.S. PATENT DOCUMENTS

| | | | | |
|---|---|---|---|---|
| 913,962 | A * | 3/1909 | Liddy | 24/17 A |
| 3,602,957 | A * | 9/1971 | Chang | 24/16 PB |
| 4,925,149 | A * | 5/1990 | DiFrancesca et al. | 248/687 |
| 5,636,503 | A * | 6/1997 | Kaspszyk | 54/23 |
| 5,853,212 | A * | 12/1998 | Daniel | 294/147 |
| 5,931,434 | A * | 8/1999 | Rodriguez | 248/345.1 |
| 6,212,741 | B1 * | 4/2001 | Cahill | 24/298 |
| 6,212,790 | B1 * | 4/2001 | Stetson | 34/97 |
| 7,096,544 | B2 * | 8/2006 | Lusardi | 24/306 |
| 2004/0006854 | A1 * | 1/2004 | Simon | 24/306 |

FOREIGN PATENT DOCUMENTS

CA        2421590 A1 *  9/2004

* cited by examiner

*Primary Examiner* — Robert J Sandy
(74) *Attorney, Agent, or Firm* — Jafari Law Group, Inc.; David V. Jafari (57) ABSTRACT

The invention is an apparatus and method for securing and protecting electronic devices, for example mobile phones, from impact. By utilizing a fastening device constructed of a flexible, stretchable or elastic material, an electronic device may be wrapped and secured in order to provide protection and prevent damage from impact. An apparatus in accordance with the present invention, for protecting an electronic device comprises, a body in the shape of a string allowing the body to create a loop around an electronic device to form a protective layer, a first fastening end at one end of the body for initiating said loop, and a second fastening end at the other end of the body to complete said loop.

30 Claims, 13 Drawing Sheets

APPARATUS AND METHOD FOR SECURING AND PROTECTING ELECTRONIC DEVICES

BACKGROUND OF THE INVENTION

1. Technical Field of the Invention

This invention relates generally to an apparatus and method for securing and protecting electronic devices, and in particular, an apparatus that may be stretched and secured around the surface of electronics, for example mobile phones, to provide protection and prevent damage from impact.

2. Description of the Related Art

Typically, hard compartments or cases have been utilized for transporting and preventing damage to many electronic devices. These cases are usually constructed from hard plastics, custom-fitted for the type of device the case is intended to hold. They serve to protect the electronic device housed within from being damaged when hit, dropped, or abused in some other way.

Alternatively, softer materials have been used to create covers that fit each electronic device, for example a mobile phone. These covers are usually made out of leather or similarly tough fabrics to prevent the device, for example a mobile phone, from being scratched, or otherwise preserving the mobile phone from regular wear and tear.

Although hard plastic cases may be suitable for storing electronic devices, they are bulkier and make it difficult to carry on a person, for example in a shirt's pocket. These cases are also more expensive than lighter materials such as the soft covers already discussed.

On the other hand, the lighter, less expensive covers, for example leather covers for mobile phones, are not protective enough. While flexible enough to fit around electronics such as a mobile phone, a leather cover does not provide the protection a mobile phone requires under certain types of common stress that is inflicted on such devices, for example when a mobile phone is dropped or otherwise suffers from some impact.

Therefore, there is a need in the art for a device that is inexpensive, flexible, light weight, and easily transportable, yet constructed of a strong material capable of providing the adequate protection from the common stress that may be regularly inflected on electronic devices. It is to these ends that the present invention has been developed.

SUMMARY OF THE INVENTION

To minimize the limitations found in the prior art, and to minimize other limitations that will be apparent upon the reading of the specification, the present invention provides an apparatus and method for securing and protecting electronic devices from impact.

An apparatus in accordance with the present invention, for protecting an electronic device comprises, a body in the shape of a string allowing the body to create a loop around an electronic device to form a protective layer, a first fastening end at one end of the body for initiating said loop, and a second fastening end at the other end of the body to complete said loop.

A method for protecting an electronic device using an apparatus comprises, initiating a loop around said electronic device using a first fastening end, wrapping said electronic device with a string shaped body of said apparatus to form a protective layer, and completing said loop using a second fastening end.

Another apparatus, in accordance with the present invention, for absorbing an impact of an electronic device when dropped comprises, a body in the shape of a string allowing the body to create a loop around the electronic device to form a protective layer, a first connector at one end of said body for initiating said loop, and a second connector at the other end of said body to complete said loop, wherein the density of the body is dependent on a weight of the electronic device, the body is made out of a material that absorbs an impact when the electronic device is dropped, the body has a flat internal face to conform to the surface of the electronic device, and wherein the material is stretchable.

It is an objective of the present invention to provide an apparatus that is flexible enough to conform to a variety of electronic devices.

It is another objective of the present invention to provide an apparatus that is strong enough to withstand significant impact, providing electronics such as mobile phones with adequate protection from commonly user-inflicted stresses.

It is still another objective of the present invention to provide electronic devices with a protective material that is strong, yet light-weight, so as to allow easy transportation.

It is still another objective of the present invention to provide an apparatus that may be easily attached and detached between use and storage.

It is still another objective of the present invention to provide an apparatus made of a material that can absorb shock and produce a bounce when dropped.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. The drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the invention.

Figure 1:
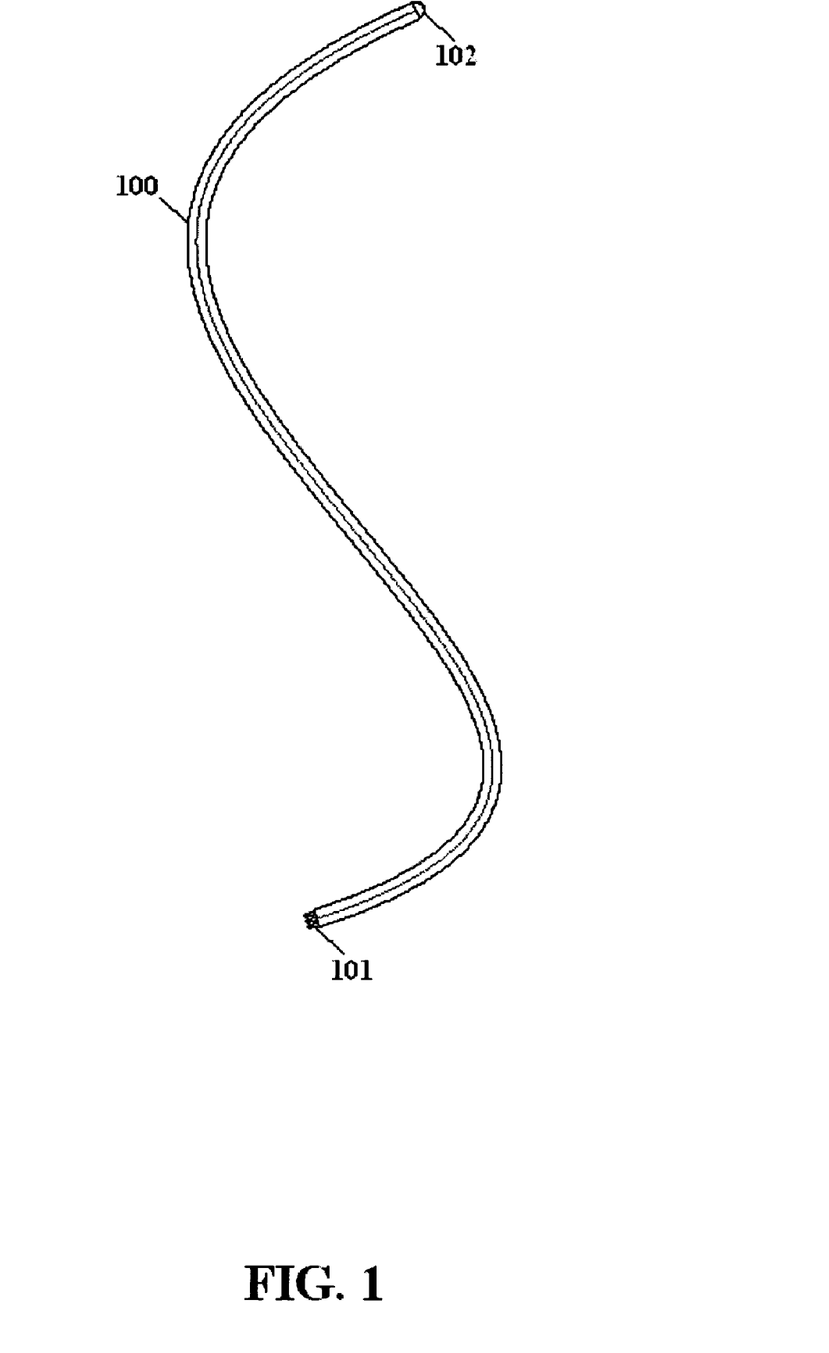
FIG. 1 is an illustration of a fastening device in accordance to an exemplary embodiment of the present invention.

Turning first to FIG. 1, an illustration of fastening device 100, in accordance to an exemplary embodiment of the present invention is shown, comprising fastening end 101, and fastening end 102.

Typically, fastening device 100 is flexible, constructed of a rubber or plastic that gives fastening device 100 a wide range of motion for easy attachment to an electronic device such as a mobile phone. Fastening device 100 may be constructed of any type of durable material that will not only sustain a varying range of stress, but is also light-weight, flexible, strong and shock absorbent. Fastening device 100 may be long or short depending on its application, without departing from the scope of the present invention. For example, fastening device 100 may be substantially 3 feet so that fastening device 100 may be applied successfully to a number of devices. Alternatively, fastening device 100 may be shorter, to be utilized for small electronic devices or longer, to be utilized with larger electronic devices.

In one embodiment, fastening device 100 is made out of rubber or elastic plastic that is flexible, capable of stretching around and fitting a variety of electronic devices so that fastening device 100 may be utilized with different brands, models and types of electronic devices. For example, and without departing from the scope of the present invention, fastening device 100 is manufactured in one size to fit a majority of mobile phones available to consumers.

In another embodiment, fastening device 100 is made out of an elastic plastic or similar compound to create a tougher layer of protection around an electronic device and has a consistency and density such that fastening device 100 may bounce off the floor when dropped. For example, and without departing from the scope of the present invention, an electronic device secured with fastening device 100 bounces slightly when dropped due fastening device 100's rubber-like material.

In yet another embodiment, fastening device 100 is not elastic but is manufactured to fit a particular electronic device, for example a specific brand and model of a mobile phone.

Fastening device 100 may further comprise of additional materials to add strength and durability to fastening device 100, while increasing its protective characteristics. For example, and without limiting the scope of the present invention, fastening device 100 is made of a flexible plastic exterior with embedded with flexible or bendable metal wires in its interior. Although such a design would detract from fastening device 100's flexibility, the additional metal strengthens and further protects the electronic devices it secures.

In an exemplary embodiment, fastening device 100 comprises of an elastic material and several metal segments in the interior of the body to add protection and durability.

Fastening ends 101 and 102 may be any type of components capable of securing fastening device 100 to an electronic device such as a mobile phone. Furthermore, fastening ends 101 and 102 may secure to various types of electronic devices without departing from the scope of the present invention. For example, and without limiting the scope of the present invention, fastening ends 101 and 102 may be used to secure fastening device 100 to a mobile phone, a portable CD player, a portable DVD player, a portable radio, an mp3 player, an iPod™, a portable digital camera, a laptop computer, a PRI telephone, or any other type of electronic device whether portable or not.

In one embodiment, fastening ends 101 and 102 attach directly to an electronic device. In another embodiment, fastening ends 101 and 102 attach to each other to secure an electronic device. Fastening ends 101 and 102 may secure an electronic device in any manner that allows fastening device 100 to wrap around an electronic device and be held in place without departing from the scope of the present invention.

Fastening end 101 may interact, link, or connect with fastening end 102 using a variety of methods without departing from the scope of the present invention. In one embodiment, fastening end 101 and fastening end 102 connect to each other using corresponding Velcro™ material at each end. In another embodiment, fastening end 101 screws in to fastening end 102. In yet another embodiment, fastening end 101 latches on to fastening end 102 utilizing a system of one or more buttons. In yet another embodiment, fastening end 101 links with fastening end 102 simply by tying fastening end 101 and fastening end 102 together. And in yet another embodiment, fastening end 101 links or connects with fastening end 102 by utilizing a buckle.

In an exemplary embodiment, fastening end 101 comprises a series of hooks that latch on or link to a loop-shaped extension on fastening end 102. Such embodiment is now discussed in greater detail, referencing FIG. 2(a) and FIG. 2(b).

Figure 2A:
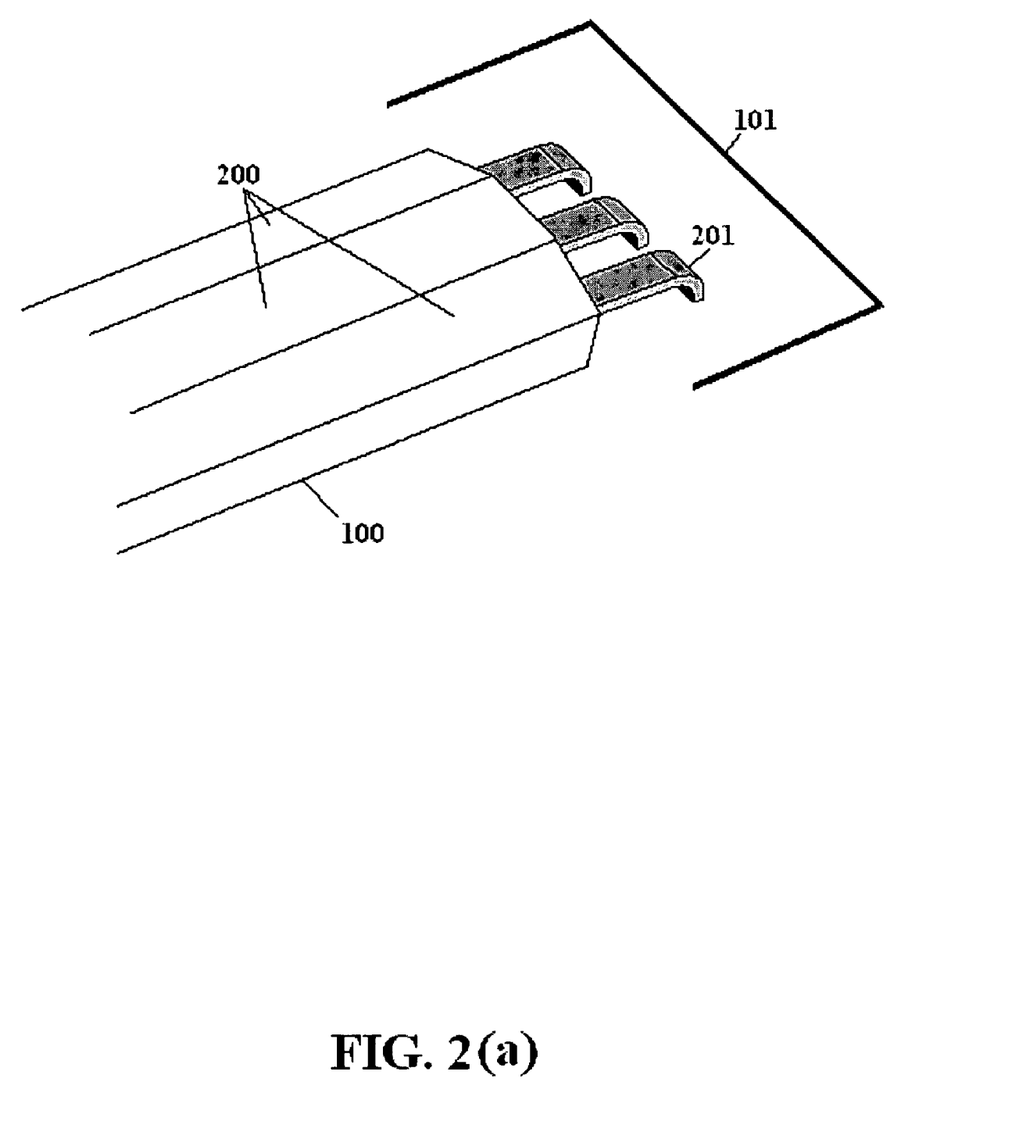
FIG. 2(a) is a close-up view of one end of fastening device 100, revealing a series of hooks utilized for securing fastening device 100, in accordance to an exemplary embodiment of the present invention.

FIG. 2(a) is a close-up view of fastening end 101 on fastening device 100, revealing a series of hooks utilized for securing fastening device 100, in accordance to an exemplary embodiment of the present invention. FIG. 2(a) shows fastening end 101 comprising of hook 201; furthermore, the close-up view reveals outer surface 200—a surface shape or pattern that runs along the entire length of fastening device 100, designed to distribute the force from an impact. These components and their interrelationships are now discussed in turn.

Typically, fastening end 101 extends from one end of the material that makes up fastening device 100, which may be desirable to maximize use of fastening device 100. However, fastening end 101 may be closer to the center of fastening device 100 without departing from the scope of the present invention.

Hook 201 is one of a series of three hooks that extend from fastening end 101. Hook 201 may be made of any material that is strong enough to hold fastening end 101 to either an electronic device or to fastening end 102. Hook 201 may be constructed out of a strong hard plastic, a metal, or any other material that provides the necessary hold required to secure fastening device 100.

Hook 201 may be one hook in a series of several hooks (as shown), or may be a single hook extending from fastening end 101. In one embodiment, hook 201 is attached internally to the remaining hooks, all which extend from one single metal plate embedded within fastening device 100. In another embodiment, hook 201 is a single metal component extending from interior metal wires that run throughout fastening device 100, see FIG. 5.

Outer surface 200 runs along the exterior surface of fastening device 100, and is shaped in such a way so as to distribute the force from an impact. This may be desirable in that the feature adds to the protective characteristics of fastening device 100. Nevertheless, outer surface 200 may be flat, giving fastening device 100 two flat surfaces, without limiting the scope of the present invention.

If designed to absorb the force from an impact, outer surface 200 may comprise a variety of non-flat shapes such as an oval shape, a trapezoidal shape, a triangular shape, or any other shape running the length of fastening device 100 without departing from the scope of the present invention.

Figure 6:
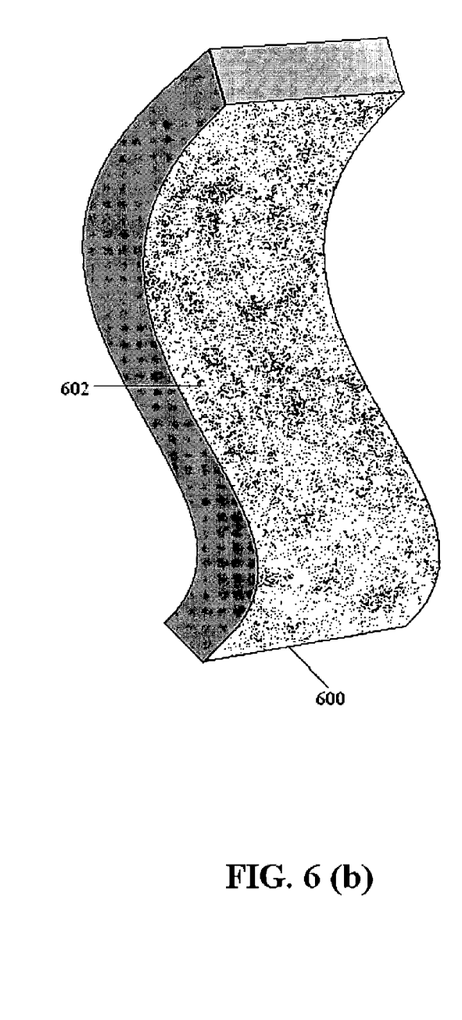
FIG. 6(a) illustrates the front view of a fastening device in accordance to one embodiment of the present invention.
FIG. 6(b) illustrates the back view of fastening device 600 in accordance to one embodiment of the present invention.

Alternatively, a shock absorbent shape may include a pattern on outer surface 200 which serves as a shock absorbent and provides an aesthetic appeal. Outer surface 200 is the visible surface upon applying fastening device 100 to secure an electronic device. Thus, it may be desirable to decorate outer surface 200 or apply designs to add aesthetic appeal, see FIG. 6(*a*) and FIG. 6(*b*).

Turning next to FIG. 2(*b*), a close-up view of another end of fastening device 100 is illustrated, revealing looped fixture 202 extending from fastening end 102, to which one or more hooks (i.e. hook 201) may be linked or latched in securing fastening device 100, in accordance to an exemplary embodiment of the present invention.

Figure 2B:
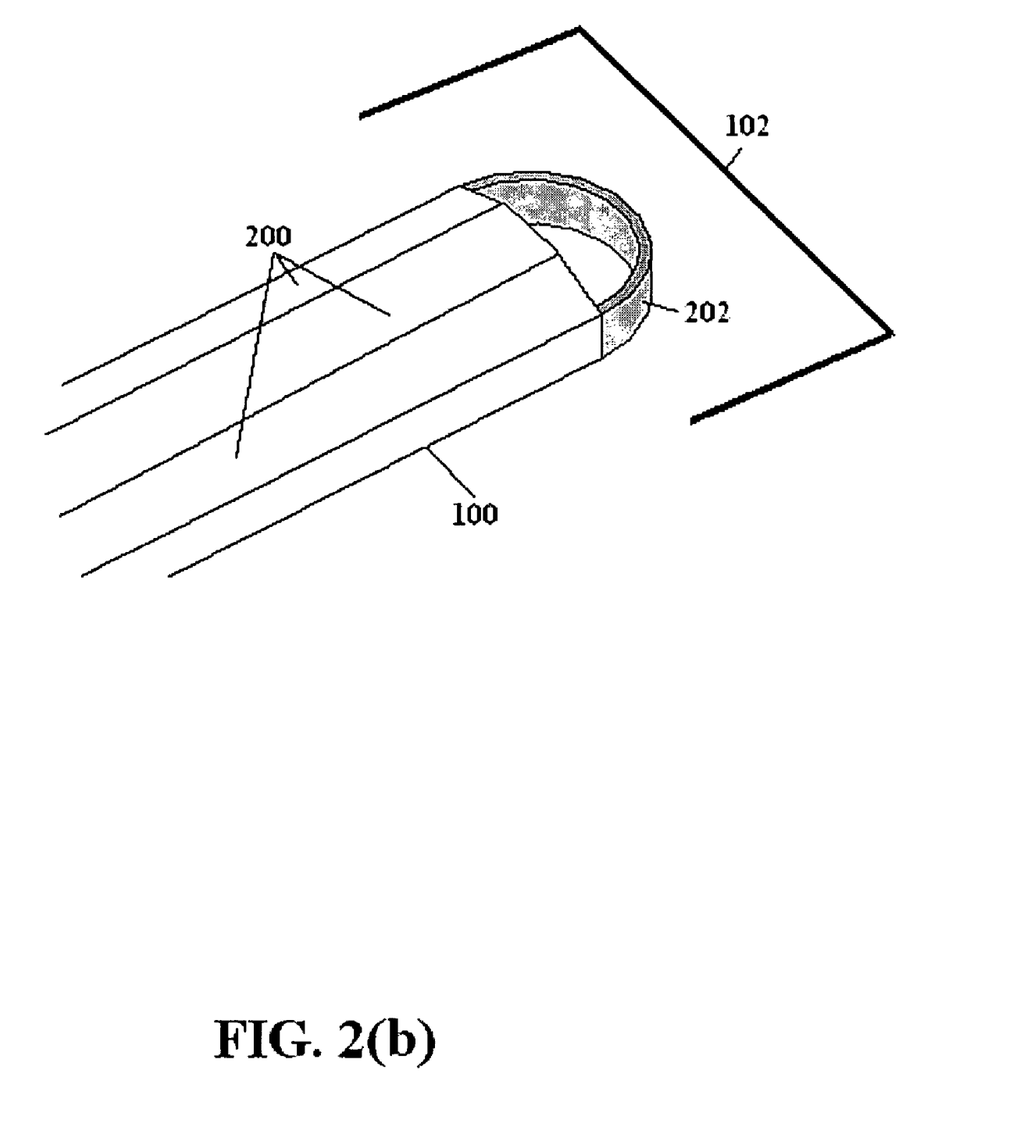
FIG. 2(b) is a close-up view of another end of fastening device 100, revealing a looped fixture, extending from fastening end 102, to which a series of hooks may be attached in securing fastening device 100, in accordance to an exemplary embodiment of the present invention.

Typically, fastening end 102 extends from one end of the material that makes up fastening device 100, which may be desirable to maximize use of fastening device 100. However, fastening end 102 may be closer to the center of fastening device 100 without departing from the scope of the present invention.

Figure 2C:
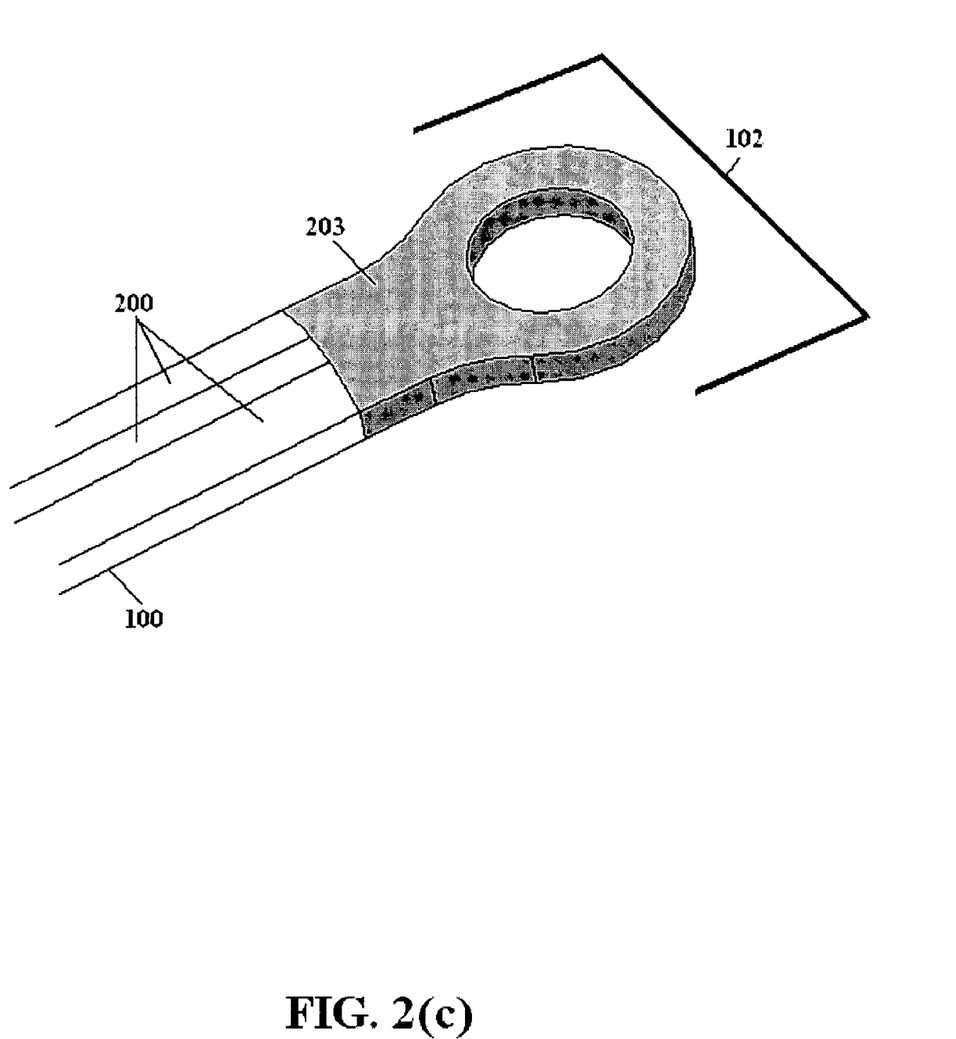
FIG. 2(c) is a close-up view of yet another embodiment of fastening end 102, revealing a looped shape integrated into the body of fastening device 100, to which a single hook or a series of hooks may be attached in securing fastening device 100.

Looped fixture 202 extends from fastening end 102. Looped fixture 202 may be made of any material that is strong enough to hold fastening end 102 to either an electronic device or to fastening end 101. Like hook 201 looped fixture 202 may be constructed out of a strong hard plastic, a metal, or any other material that provides the necessary hold required to secure fastening device 100. In one embodiment, looped fixture 202 forms part of fastening device 100 so that fastening end 102 is one and the same with looped fixture 202 fastening end 102 being molded or manufactured to resemble a looped fixture, see FIG. 2(*c*).

In one embodiment, looped fixture 202 is attached internally from one single metal plate embedded in fastening device 100. In another embodiment, looped fixture 202 is a single metal component extending from interior metal wires that run throughout fastening device 100, see FIG. 5.

In an exemplary embodiment, looped fixture 202 forms part of fastening end 102, and thus is made out of the same material as fastening device 100. Such embodiment is now discussed in greater detail with reference to FIG. 2(*c*).

Now turning to FIG. 2(*c*), a close-up view of another embodiment of fastening end 102 is illustrated, revealing a shape resembling looped fixture 202, which is integrated into the body of fastening device 100, to which fastening end 101 may be attached or linked when securing fastening device 100 to an electronic device, also see FIG. 4(*b*) and FIG. 4(*e*).

Looped end 203 is typically an extension of fastening device 100's body and is made from the same material as fastening device 100. However, looped end 203 may be a different component affixed to fastening device 100 much like hook 201 or looped fixture 202, which may be connected or attached at fastening end 101 and fastening end 102, respectively. In one embodiment looped end 203 is a metal component affixed to fastening end 102. In another embodiment, looped end 203 is a hard plastic component affixed to fastening end 102.

Fastening ends 101 and 102 may comprise of any of the above mentioned components such as hook 201, looped fixture 202 and looped end 203, or any other types of components or features that allow fastening end 101 to be linked with fastening end 102, without departing from the scope of the present invention.

FIG. 2(*d*) illustrates yet another embodiment for fastening device 100, wherein fastening end 101 may fuse or stick to fastening end 102 by having an increased coefficient of friction.

Fastening device 100 is illustrated in FIG. 2(*d*), showing both fastening end 101 and fastening end 102 with a special flat ends 204 and 205, respectively.

Figure 2D:
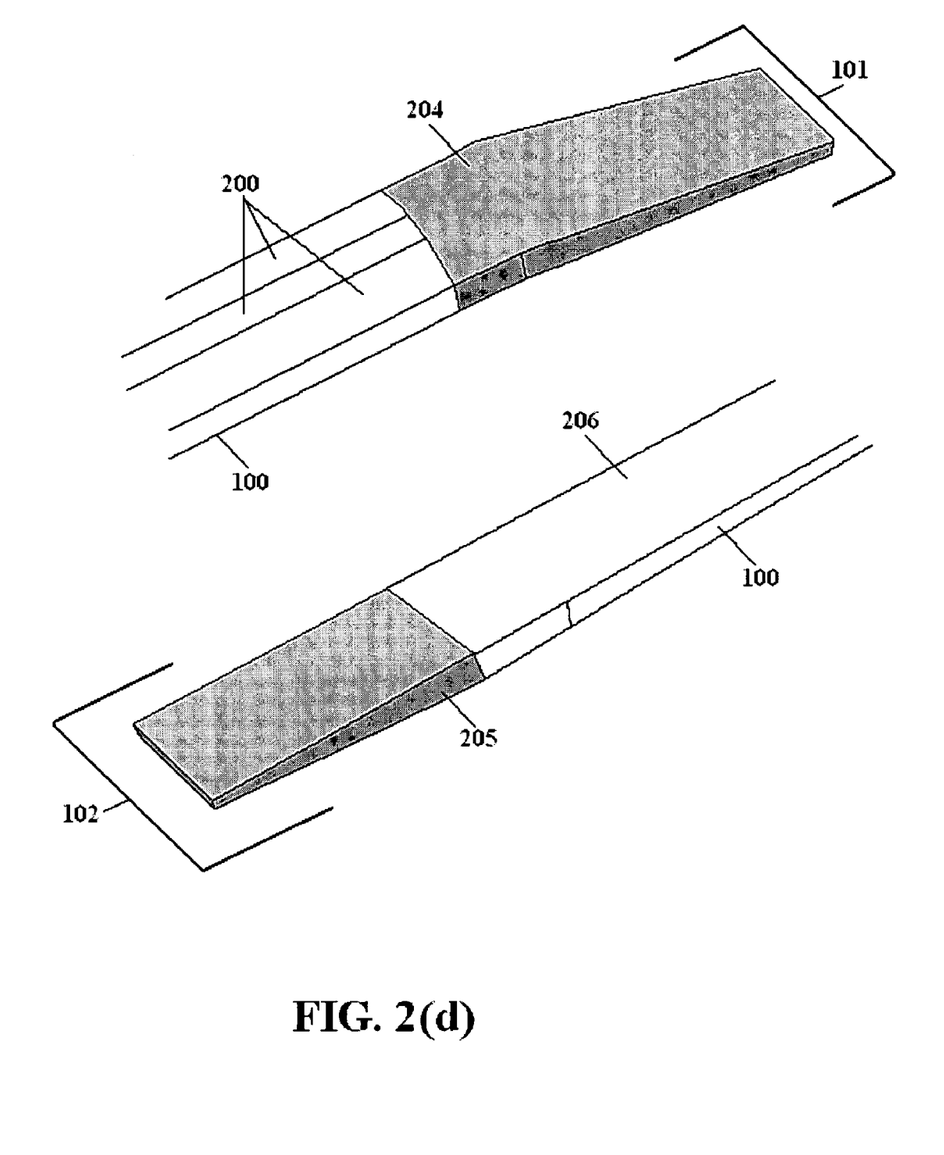
FIG. 2(d) is a close-up view of yet another embodiment of fastening end 101 and fastening end 102, wherein each fastening end is made of a material that sticks to the body of fastening device 100 and may stick or fuse with each other, in securing fastening device 100 by having an increased coefficient of friction.

Typically, flat end 204 and flat end 205 are constructed of a rubber-like material that is sticky, or may fuse to each other or with any other part of fastening device 100 by having an increased coefficient of friction.

In one embodiment, fastening device 100 hooks (with one end such as hook 201) to an electronic device, while the other end (i.e. flat end 204) sticks or fuses with any part of fastening device 100's body, once wrapped around the electronic device.

In another embodiment, fastening device 100 utilizes both flat end 204 and flat end 205. Once fastening device 100 has been wrapped around an electronic device, each end 205 and 204 are fused or tied together.

In still another embodiment, fastening device 100 only utilizes one end, for example flat end 205, and the other end does not stick nor attach to the electronic device. The non-stick end of fastening device 100 is secured by wrapping the rest of fastening device 100 around the electronic device. Once wrapped around properly, flat end 205 sticks or fuses with any part of fastening device 100 that is exposed around the electronic device.

Finally, FIG. 2(*d*) shows a flat side 206. Flat side 206 may be desirable so that flat side 206 may rest directly on the electronic device, giving fastening device 100 more traction so that it does not slip from the electronic device. A more detailed discussion of the interior and exterior sides or surfaces of a fastening device in accordance to the present invention are discussed in particular with reference to FIG. 6(*a*) and FIG. 6(*b*).

Figure 3A:
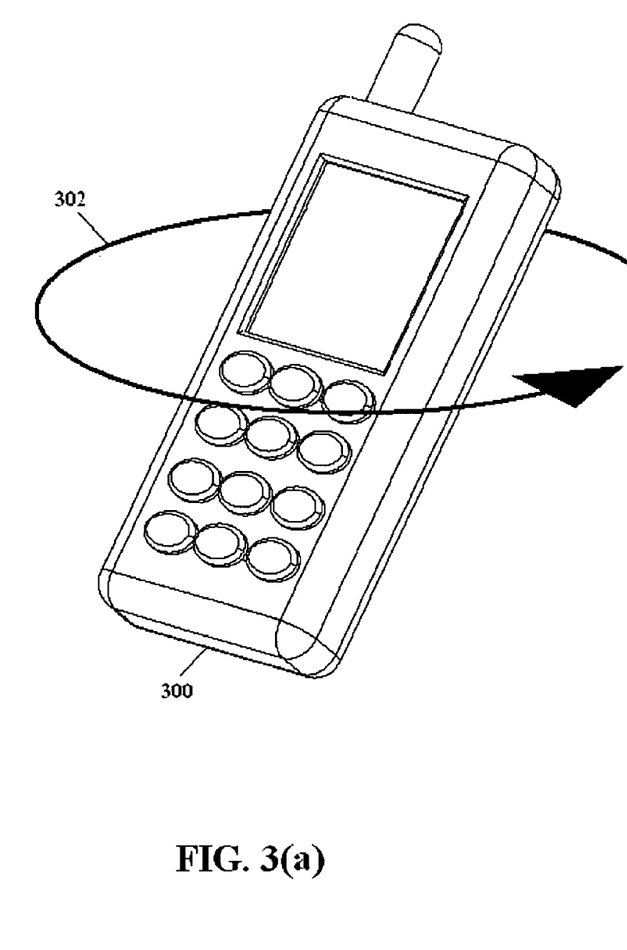
FIG. 3(a) and FIG. 3(b) illustrate one method of securing fastening device 100 to an electronic device in accordance to an exemplary embodiment of the present invention.
Figure 3B:
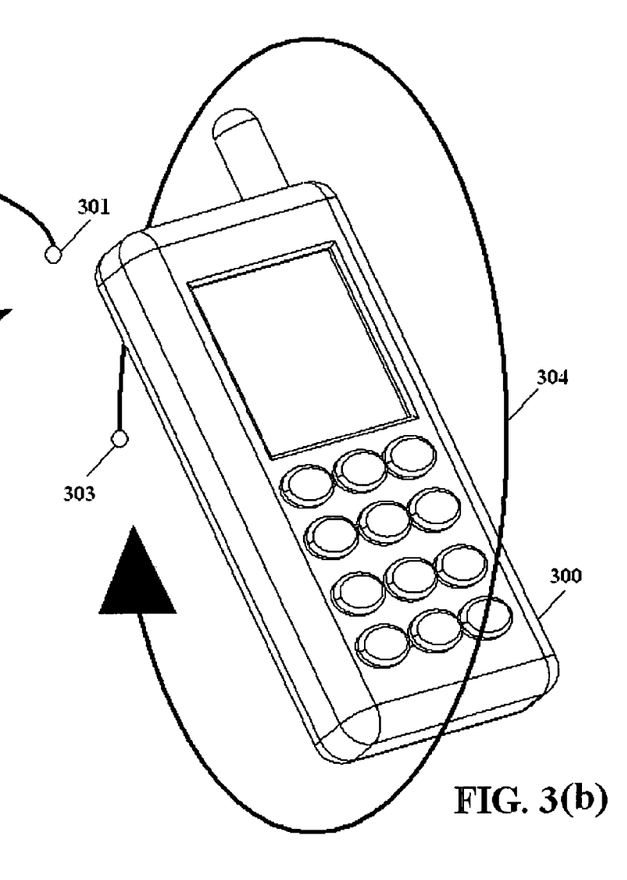

Now turning to FIG. 3(*a*) and FIG. 3(*b*) one method of fastening an apparatus to an electronic device in accordance to an exemplary embodiment of the present invention is illustrated.

FIG. 3(*a*) shows electronic device 300 as an example of one of many types of electronic devices to which fastening device 100 may be secured. Directional arrow 302 and directional arrow 304 are ways in which fastening device 100 may be wrapped around electronic device 300, by beginning at starting point 301 or starting point 303 respectively.

Figure 4A:
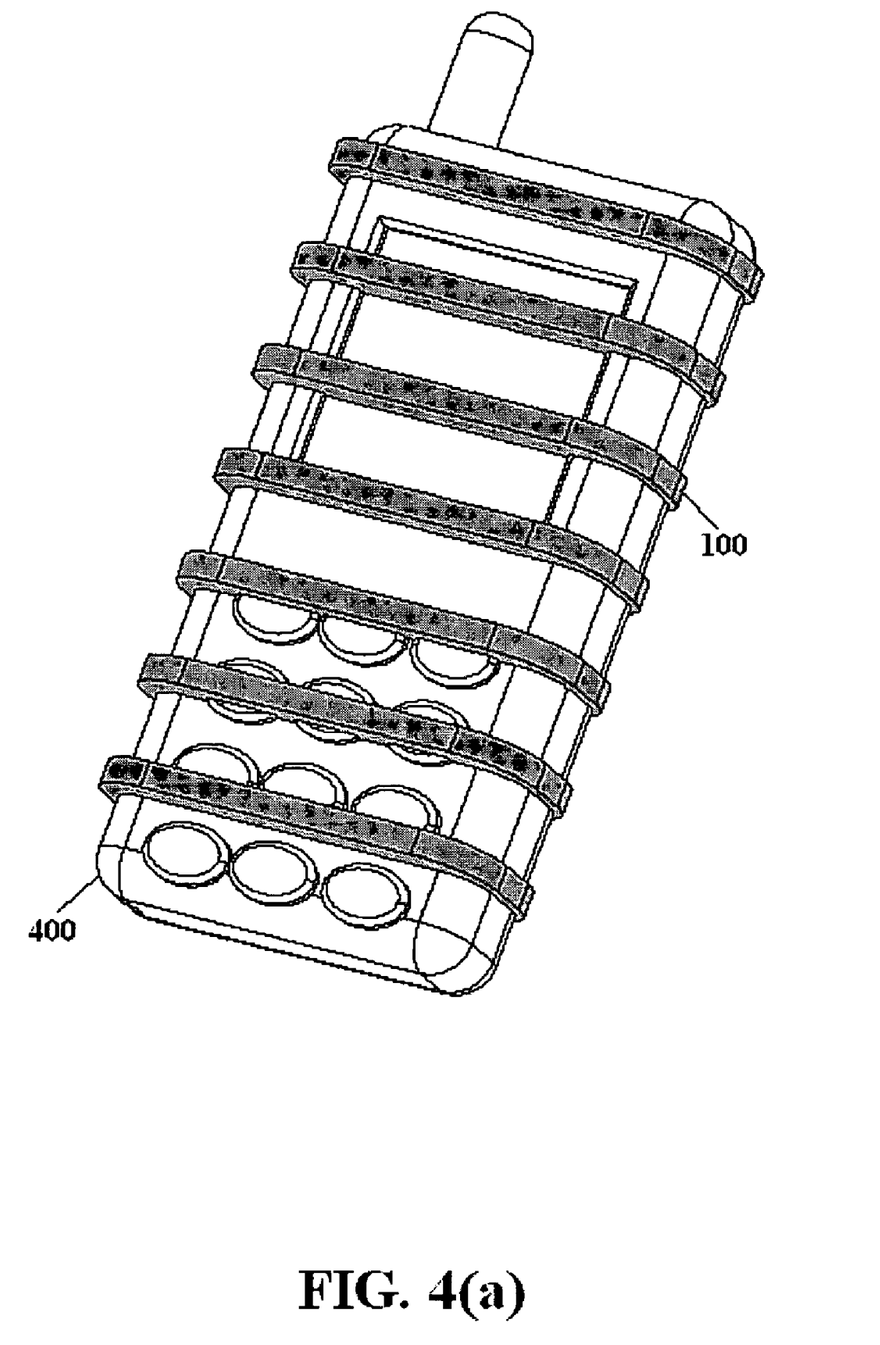
FIGS. 4(a)-4(e) illustrate a mobile phone held and secured with at least one fastening device in accordance to multiple embodiments of the present invention.
Figure 4B:
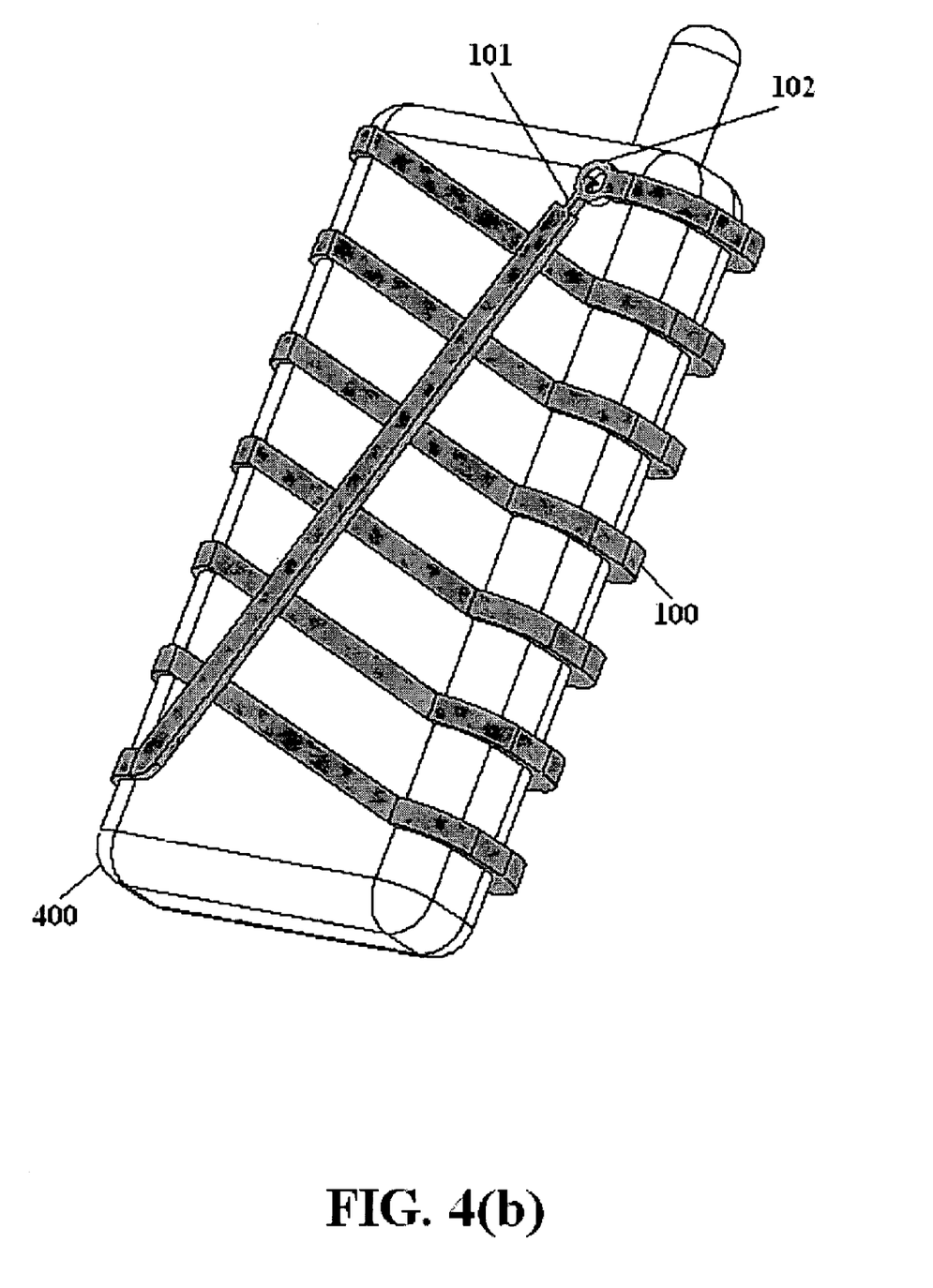

For example, and without limiting the scope of the present invention, fastening device 100 may be horizontally wrapped around electronic device 300 by holding one end (e.g. fastening end 102) against electronic device 300 and holding another end (e.g. fastening end 101) at starting point 301. By circulating or looping fastening device 100 as indicated by directional arrow 302, fastening device 100 may be horizontally wrapped around electronic device 300. See FIG. 4(*a*) and FIG. 4(*b*).

Figure 4C:
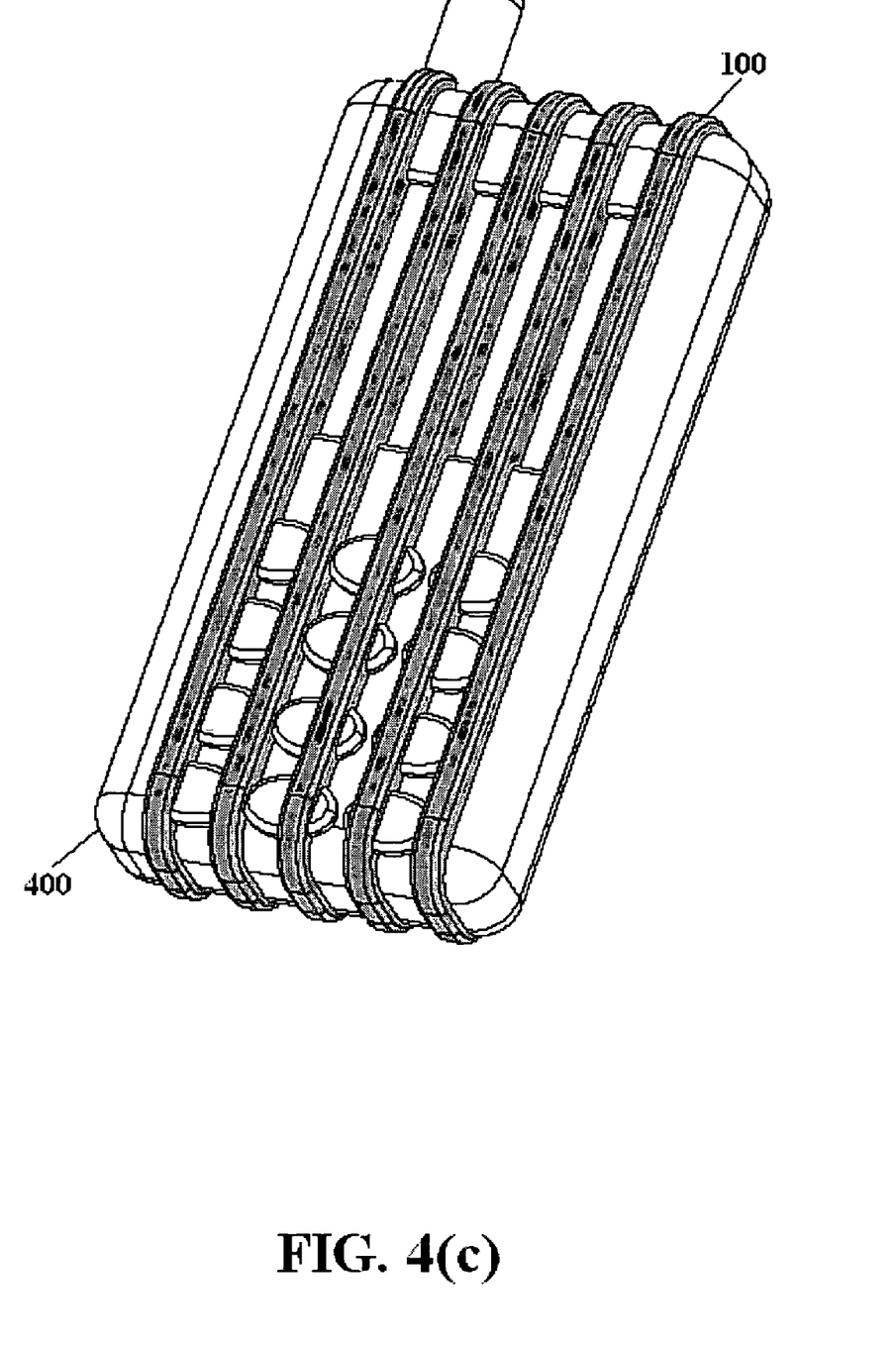

Similarly fastening device 100 may be vertically wrapped around electronic device 300 by holding one end (e.g. fastening end 101) against electronic device 300 and holding another end (e.g. fastening end 102) at starting point 303. By looping fastening device 100 as indicated by directional arrow 302, fastening device 100 may be vertically wrapped around electronic device 300. See FIG. 4(*c*).

Figure 4D:
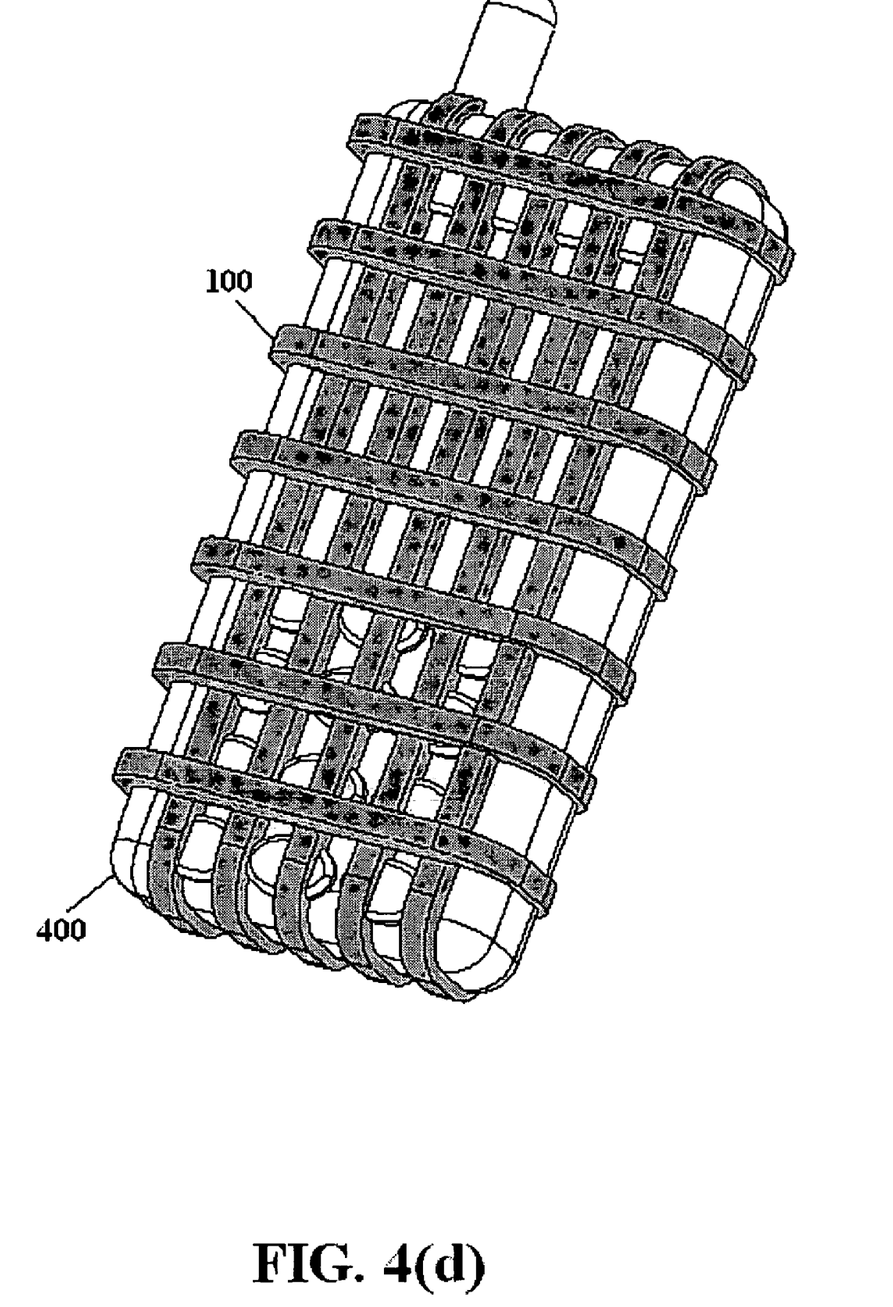

Additionally, fastening device 100 may be wrapped around electronic device 300 by combining the horizontal and vertical circulation or looping of fastening device 100 around electronic device 300. See FIG. 4(*d*).

Again, electronic device 300 may be a mobile phone, a portable CD player, a portable DVD player, a portable radio, an mp3 player, an iPod™, a portable digital camera, a laptop computer, a PRI telephone, or any other type of electronic device whether portable or not.

FIGS. 4(*a*)-4(*e*) illustrate a mobile phone held and secured with a fastening device in accordance to multiple embodiments of the present invention.

FIG. 4(*a*) illustrates a mobile phone wrapped horizontally with a fastening device in accordance with one embodiment of the present invention.

Fastening device 100 loops horizontally around the mobile phone 400, to create a protective layer around mobile phone 400. In FIG. 4(*a*), fastening device 100 wraps around the mobile phone 400 for a total of seven revolutions; however, fastening device 100 could wrap around mobile phone 400 for one revolution, two revolutions, three revolutions, or any number of revolutions that is desired without departing from the scope of the present invention.

Additionally, in FIG. 4(*a*), mobile phone 400 is used to illustrate the protective layer effect achieved by looping fastening device 100 around mobile phone 400. Fastening device 100 can loop around mobile phone, a potable CD player a portable DVD player, a portable radio, a PDA, an mp3 player, a portable digital camera, a laptop, a PRI Telephone, or any other electronic device without departing from the scope of the present invention.

FIG. 4(*b*) is a back view of mobile phone 400 wrapped in fastening device 100, as shown in FIG. 4(*a*). This view exposes fastening device 100's linked fastening ends 101 and 102.

FIG. 4(*c*) illustrates a mobile phone wrapped vertically with the fastening device in accordance with one embodiment the present invention.

Fastening device 100 loops vertically around the mobile phone 400, to create a protective layer around mobile phone 400. In FIG. 4(*c*), fastening device 100 wraps around the mobile phone 400 for a total of five revolutions; however, fastening device 100 could wrap around mobile phone 400 for one revolution, two revolutions, three revolutions, or any number of revolutions that may be required to secure fastening device 100 snuggly to electronic device 400, without departing from the scope of the present invention.

Additionally, in FIG. 4(*c*), mobile phone 400 is used to illustrate the protective layer effect achieved by looping fastening device 100 around electronic devices. Fastening device 100 can loop around a mobile phone, a potable CD player a portable DVD player, a portable radio, a PDA, an mp3 player, a portable digital camera, a laptop, or any other electronic device without departing from the scope of the present invention.

FIG. 4(*d*) illustrates a mobile phone wrapped horizontally and vertically in accordance with one embodiment the present invention.

Fastening device 100 loops around mobile phone 400 horizontally, and vertically, to create a protective layer around mobile phone 400. In FIG. 4(*d*), fastening device 100 wraps around mobile phone 400 for a total of five revolutions vertically, and seven revolutions horizontally; however, fastening device 100 could wrap around mobile phone 400 for one revolution, two revolutions, three revolutions, or any combination of horizontal and vertical revolutions that may be required to secure fastening device 100 snuggly to electronic device 400, without departing from the scope of the present invention.

Additionally, in FIG. 4(*d*), mobile phone 400 is used to illustrate the protective layer effect achieved by looping fastening device 100 around mobile phone 400. Fastening device 100 can loop around mobile phone, a potable CD player a portable DVD player, a portable radio, a PDA, an mp3 player, a portable digital camera, a laptop, or any other electronic device without departing from the scope of the present invention.

FIG. 4(*e*) illustrates another embodiment of the present invention wherein more than one fastening device is utilized to secure and protect mobile phone 400.

Figure 4E:
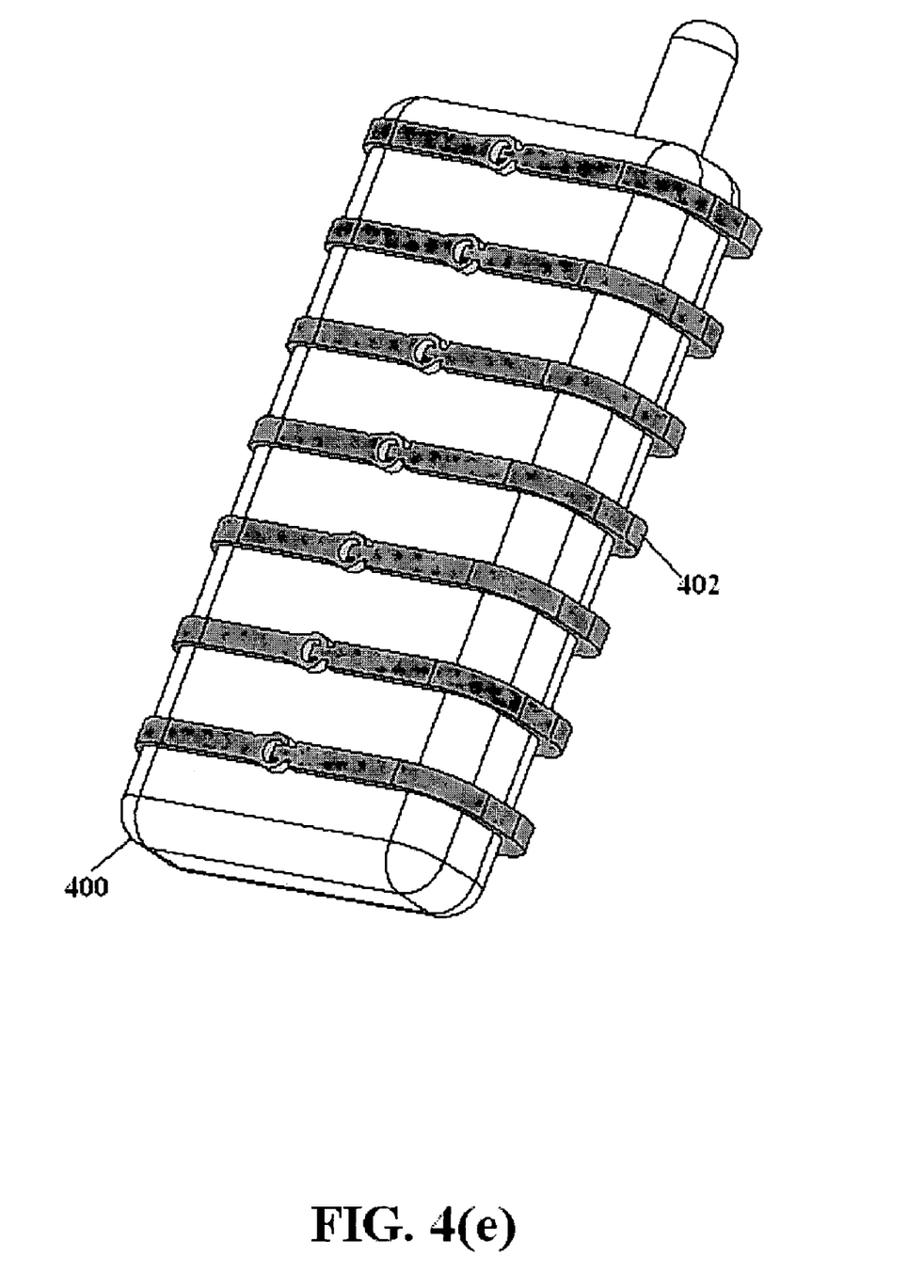

Instead of utilizing one single (longer) fastening device 100, in another embodiment of the present invention, a series of shorter fasteners may be used, such as fastening device 402.

Fastening device 402 may be desirable because smaller (or shorter) segments allow a more diverse use of a fastening device in accordance with the present invention. For example, and without departing from the scope of the present invention, fastening device 402 may be used by itself to secure a small device such as a pager; when a user decides to apply fastening device to a larger electronic device such as mobile phone 400, a user may then use more than one device similar in size and length as fastening device 402.

Figure 5:
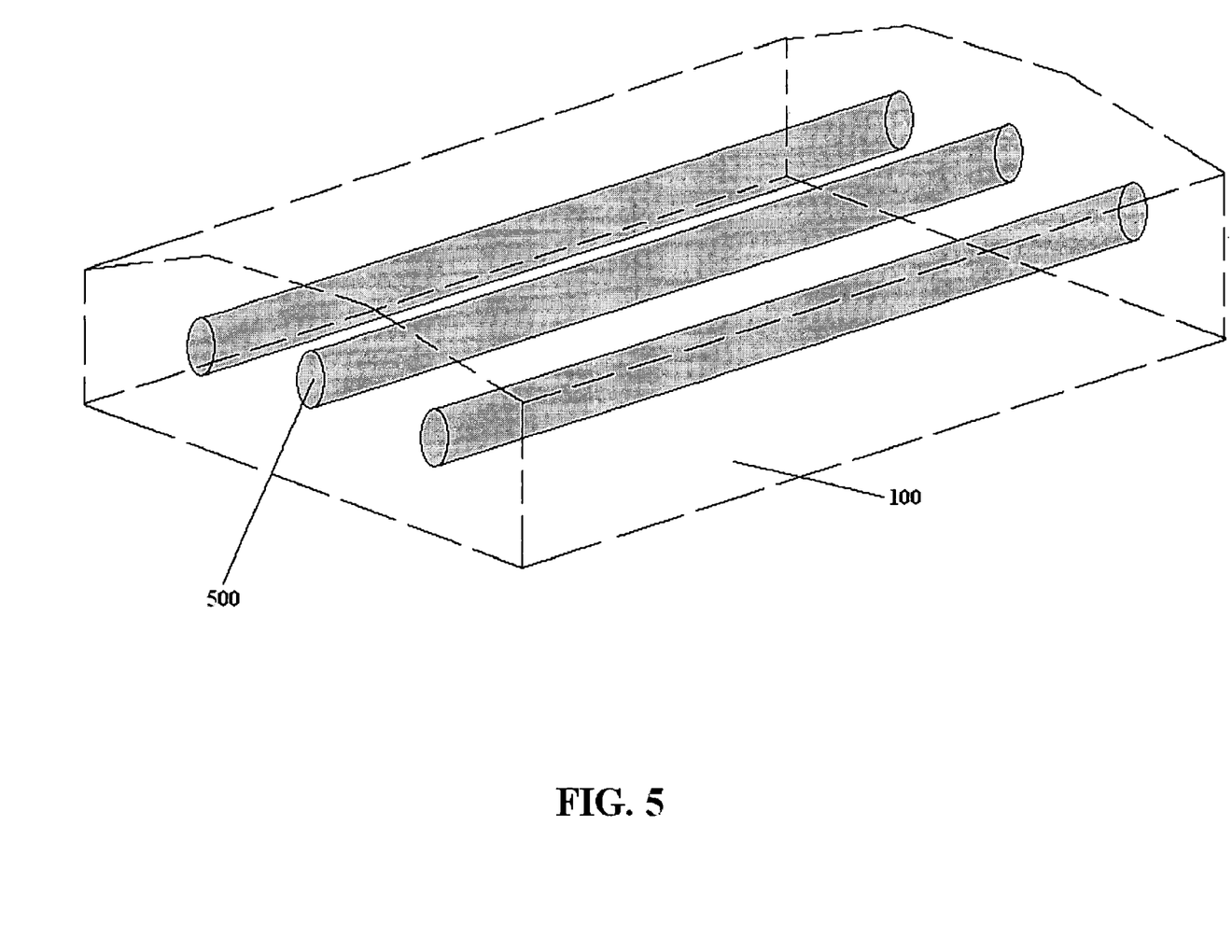
FIG. 5 illustrates the internal components of fastening device 100, utilizing a metallic wire to provide structural rigidity.

FIG. 5 illustrates fastening device 100, internally comprising of metallic wires to provide structural rigidity, in accordance to one embodiment of the present invention.

In FIG. 5, fastening device 100 is shown with metallic wire 500 running through the entire length of fastening device 100. Metallic wire 500 is used to provide structural rigidity of fastening device 100, and to ensure that fastening device 100 conforms to the outer surface area of an electronic device.

However, fastening device 100 does not need metallic wire 500 in order to wrap around an electronic device. In an alternative embodiment, fastening device 100 is made out of stretchable elastic material; thus eliminating the need to maintain structural rigidity.

Metallic wire 500 may be made out of steel; however, metallic wire 500 can be made out of aluminum, lead, iron, or any other material that is capable of providing structural rigidity without departing from the scope of the present invention. Moreover, in the current embodiment, FIG. 5 shows three instances of metallic wire 500. However, the current invention could comprise of one metallic wire 500, two metallic wires, three metallic wires, four metallic wires, or any number of metallic wires built into fastening device 100 without departing from the scope of the present invention.

FIG. 6(*a*) illustrates the front view of a fastening device in accordance to one embodiment of the present invention. Fastening device 600 is similar to fastening device 100 discussed in FIG. 1, however enlarged to show inner surface 601. Typically, inner surface 601 is flat, and it is the surface of fastening device 600 that is in contact with an electronic device. Having a flat inner surface 601 allows the fastening device 600 to conform to the external surface of the electronic device, ensuring a snug fit between fastening device 600 and an electronic device.

FIG. 6(*b*) illustrates the outer surface of a fastening device 600 according to one embodiment of the present invention.

Fastening device 600 is similar to fastening device 100 discussed in FIG. 1 however, enlarged to show outer surface 602. Outer surface 602 runs along the exterior surface of fastening device 600, and contains a textured finish to allow for decorations to be incorporated into outer surface 602. Although in the current embodiment, outer surface 602 is textured to allow for decorations, texturing of outer surface 602 is not necessary to the functionality of the present invention, and its lack of existence will not depart from the scope of the present invention Additionally, outer surface 602 is flat with textures. However, as discussed above in FIG. 2(*a*), outer surface 602 can be in a variety of non-flat shapes to distribute the force from an impact while still maintaining such a textured surface without departing from the scope of the present invention.

An apparatus and method for securing and protecting electronic devices from impact has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. An impact-protected electronic apparatus, comprising:
   an electronic device; and
   a protective member comprising a plurality of flexible elongated members configured to make respective individual loops around the electronic device;
   wherein each of the flexible elongated members comprises:
      a first fastening end at a distal end of the flexible elongated member for initiating the loop; and
      a second fastening end at a proximal end of the flexible elongated member to complete the loop.

2. The apparatus of claim 1, wherein the protective member further comprises a material that absorbs an impact force applied from an external source.

3. The apparatus of claim 2, wherein the protective member is adapted to securely maintain contact with the electronic device via friction.

4. The apparatus of claim 3, wherein the first fastening end connects with the second fastening end utilizing the material.

5. The apparatus of claim 3, wherein the protective member further comprises a flat internal face to conform to a surface of the electronic device.

6. The apparatus of claim 2, wherein the protective member further comprises a textured external face.

7. The apparatus of claim 2, wherein the protective member further comprises a cross sectional profile along a length of the protective member in a shape that substantially distributes impact force upon the electronic device.

8. The apparatus of claim 2, wherein the protective member further comprises an internal metal wire to provide structural rigidity.

9. The apparatus of claim 1, wherein the protective member further comprises a material that is expandable and elastic.

10. The apparatus of claim 1, wherein the plurality of loops of the protective member are arranged around the electronic device in a predetermined manner.

11. The apparatus of claim 1, wherein the predetermined manner of the plurality of loops comprises at least two loops arranged in a parallel configuration around the electronic device.

12. The apparatus of claim 1, wherein the predetermined manner of the plurality of loops comprises at least two loops arranged in a perpendicular configuration around the electronic device.

13. An impact-protected electronic apparatus, comprising:
   a portable electronic device; and
   a protective member comprising a plurality of flexible elongated members configured to make respective individual loops for securely wrapping around the portable electronic device in a manner to substantially protect the device from damage due to an impact force.

14. The apparatus of claim 13, wherein the plurality of loops of the protective member is securely wrapped in a longitudinal configuration around the portable electronic device.

15. The apparatus of claim 13, wherein the plurality of loops of the protective member is securely wrapped in a latitudinal configuration around the portable electronic device.

16. The apparatus of claim 13, wherein the portable electronic device is a mobile phone.

17. The apparatus of claim 13, wherein the portable electronic device is a personal digital assistant.

18. The apparatus of claim 13, wherein the portable electronic device is a personal computer.

19. The apparatus of claim 13, wherein the portable electronic device is an electronic media device.

20. The apparatus of claim 13, wherein the elongated and elastic member is substantially three feet in length.

21. The apparatus of claim 13, wherein the plurality of loops of the protective member are arranged around the electronic device in a predetermined manner.

22. The apparatus of claim 13, wherein the predetermined manner of the plurality of loops comprises at least two loops arranged in a parallel configuration around the electronic device.

23. The apparatus of claim 13, wherein the predetermined manner of the plurality of loops comprises at least two loops arranged in a perpendicular configuration around the electronic device.

24. An accessory for a portable electronic device, comprising:
   a protective member comprising a plurality of flexible elongated members configured to make respective individual loops around the device in a manner to substantially protect the device from damage due to an impact force;
   wherein opposing ends of the protective member include fastening ends configured to mate with each other.

25. The apparatus of claim 24, wherein the plurality of loops of the protective member is securely wrapped in a longitudinal configuration around the device.

26. The apparatus of claim 24, wherein the plurality of loops of the protective member is securely wrapped in a latitudinal configuration around the device.

27. The apparatus of claim 24, wherein the protective member is substantially three feet in length.

28. The apparatus of claim 24, wherein the plurality of loops of the protective member are arranged around the electronic device in a predetermined manner.

29. The apparatus of claim 24, wherein the predetermined manner of the plurality of loops comprises at least two loops arranged in a parallel configuration around the electronic device.

30. The apparatus of claim 24, wherein the predetermined manner of the plurality of loops comprises at least two loops arranged in a perpendicular configuration around the electronic device.

* * * * *